United States Patent
Krishnamoorthy et al.

(10) Patent No.: US 11,694,692 B2
(45) Date of Patent: Jul. 4, 2023

(54) SYSTEMS AND METHODS FOR AUDIO ENHANCEMENT AND CONVERSION

(71) Applicant: Bank of America Corporation, Charlotte, NC (US)

(72) Inventors: Madhusudhanan Krishnamoorthy, Chennai (IN); Ayesha Farha Ameer Hamza, Velachery (IN); Ramya Gangathara Rao, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 267 days.

(21) Appl. No.: 17/095,356

(22) Filed: Nov. 11, 2020

(65) Prior Publication Data

US 2022/0148598 A1    May 12, 2022

(51) Int. Cl.
*G10L 15/26*    (2006.01)
*G10L 15/20*    (2006.01)
(Continued)

(52) U.S. Cl.
CPC ............. *G10L 15/26* (2013.01); *G10L 15/20* (2013.01); *G10L 15/22* (2013.01); *G10L 25/18* (2013.01)

(58) Field of Classification Search
CPC ......... G10L 15/26; G10L 15/20; G10L 25/18; G10L 21/0232; G10L 15/1822;
(Continued)

(56) References Cited

U.S. PATENT DOCUMENTS 7,243,060 B2    7/2007   Atlas et al.
7,627,477 B2    12/2009  Wang et al.
(Continued)

FOREIGN PATENT DOCUMENTS

CN      103999076 B    5/2017
EP        3007467 B1    8/2017
(Continued)

OTHER PUBLICATIONS

N. Juillerat et al., "Enhancing the Quality of Audio Transformations Using the Multi-Scale Short-Time Fourier Transform," Proceedings of the 10th IASTED International Conference (SIP 2008), Aug. 18-20, 2008, Kailua-Kona, HI, USA.

*Primary Examiner* — Richemond Dorvil
*Assistant Examiner* — Nadira Sultana

(57) ABSTRACT

A system accesses a first digital audio file that includes a plurality of spoken instructions. The system converts the first digital audio file to a first spectrogram image, applies a filter to determine whether an image quality of the first spectrogram image is below a predetermined image quality, and in response, generates a second spectrogram image from the first spectrogram image using a training model. The system converts the second spectrogram image to a second digital audio file and converts the second digital audio file into multiple vectors that each correspond to a particular spoken instruction. The system identifies related vectors and concatenates the related vectors together in order to create a plurality of concatenated vectors. The system generates, using the plurality of concatenated vectors, a third digital audio file that includes concatenated spoken instructions from the first digital audio file.

20 Claims, 3 Drawing Sheets

(51) Int. Cl.
*G10L 25/18* (2013.01)
*G10L 15/22* (2006.01)

(58) Field of Classification Search
CPC ........... G10L 13/07; G10L 15/22; G06N 3/04; G06K 7/1447; H04R 3/04
See application file for complete search history.

(56) References Cited

U.S. PATENT DOCUMENTS

| | | | |
|---|---|---|---|
| 8,069,038 B2 | 11/2011 | Malah et al. | |
| 8,131,544 B2 | 3/2012 | Herbig et al. | |
| 8,390,445 B2 | 3/2013 | Betts et al. | |
| 8,396,705 B2 | 3/2013 | Bilobrov | |
| 8,553,984 B2 | 10/2013 | Slotine et al. | |
| 8,582,792 B2 | 11/2013 | Chao et al. | |
| 8,588,427 B2 | 11/2013 | Uhle et al. | |
| 8,606,566 B2 | 12/2013 | Li et al. | |
| 8,751,246 B2 | 6/2014 | Lecomte et al. | |
| 8,793,123 B2 | 7/2014 | Disch | |
| 8,886,531 B2 | 11/2014 | Vogel | |
| 8,930,186 B2 | 1/2015 | Hetherington et al. | |
| 8,953,811 B1 | 2/2015 | Sharifi et al. | |
| 9,093,120 B2 | 7/2015 | Bilobrov | |
| 9,275,647 B2 | 3/2016 | Papakipos et al. | |
| 9,291,697 B2 | 3/2016 | Kim et al. | |
| 9,305,317 B2 | 4/2016 | Grokop et al. | |
| 9,355,649 B2 | 5/2016 | King et al. | |
| 9,542,488 B2 | 1/2017 | Sharifi | |
| 9,564,148 B2 | 2/2017 | Packowski et al. | |
| 9,602,938 B2 | 3/2017 | Goldstein et al. | |
| 9,666,183 B2 | 5/2017 | Visser et al. | |
| 9,813,810 B1 | 11/2017 | Nongpiur | |
| 10,129,658 B2 | 11/2018 | Rubinstein et al. | |
| 10,360,926 B2 | 7/2019 | Mortensen et al. | |
| 10,404,859 B1 | 9/2019 | Hernandez | |
| 10,426,410 B2 | 10/2019 | Byron et al. | |
| 10,546,590 B2 | 1/2020 | Sharma et al. | |
| 10,607,650 B2 | 3/2020 | Chordia et al. | |
| 10,929,464 B1* | 2/2021 | Zuczek | G06F 16/738 |
| 2013/0064379 A1* | 3/2013 | Pardo | H04S 7/40 |
| | | | 381/56 |
| 2013/0282372 A1 | 10/2013 | Visser et al. | |
| 2014/0214190 A1 | 7/2014 | Wang | |
| 2015/0235637 A1* | 8/2015 | Casado | G10L 15/20 |
| | | | 704/235 |
| 2016/0071526 A1 | 3/2016 | Wingate | |
| 2016/0284346 A1* | 9/2016 | Visser | G10L 25/30 |
| 2017/0061505 A1 | 3/2017 | Thramann | |
| 2017/0061978 A1 | 3/2017 | Wang et al. | |
| 2017/0178664 A1* | 6/2017 | Wingate | G10L 21/0308 |
| 2019/0332840 A1* | 10/2019 | Sharma | G06K 7/1447 |
| 2021/0110841 A1* | 4/2021 | Weber | H04R 3/04 |
| 2021/0360349 A1* | 11/2021 | Nyayate | H04R 5/04 |

FOREIGN PATENT DOCUMENTS

| | | |
|---|---|---|
| EP | 2151822 B1 | 4/2018 |
| JP | 5686369 B | 1/2015 |
| KR | 102151682 B1 | 9/2020 |
| TW | 1579834 B | 7/2017 |

\* cited by examiner

SYSTEMS AND METHODS FOR AUDIO ENHANCEMENT AND CONVERSION

TECHNICAL FIELD

The present disclosure relates generally to digital audio files, and more specifically to systems and methods for audio enhancement and conversion.

BACKGROUND

Digital audio files are computer files that store audio in computer memory. As one example, a digital audio file may store digitized audio captured by a microphone. The audio stored in digital audio files may sometimes be corrupted, unintelligible, or otherwise of poor quality.

SUMMARY

Digital audio files are computer files that store audio in computer memory. As one example, a digital audio file may store digitized audio captured by a microphone. Digital audio files may be used by various enterprise applications to increase worker productivity. For example, business users may generate audio files in order to transmit spoken instructions for a certain application. As a specific example, business users may speak instructions regarding database changes (e.g., changes in database schema design, functional context changes, new cluster additions, etc.) into a microphone in order to record the instructions into a digital audio file. The digital audio file may then be analyzed by an application in order to implement the spoken instructions. However, the audio stored in digital audio files may sometimes not be usable by certain applications. For example, the audio stored in digital audio files may be corrupted, unintelligible, have ungrouped instructions, or otherwise be of poor quality.

This disclosure contemplates an audio file enhancer that automatically converts an input digital audio file into an output digital audio file that is more usable by various software applications. Generally, certain embodiments of the audio file enhancer first enhance the quality of the input digital audio file using an audio quality enhancement module (e.g., audio quality enhancement module 220 described below). The audio quality enhancement module transforms the input digital audio file into a spectrogram image, utilizes a training model to produce an enhanced spectrogram image, and then transforms the enhanced spectrogram image back into a digital audio file. The output digital audio file is then analyzed by certain embodiments using a requirements clustering module (e.g., requirements clustering module 230 described below). The requirements clustering module analyzes the output digital audio file from the audio quality enhancement module in order to identify and group similar spoken instructions (e.g., all the spoken instructions for a particular system or application) together within the audio file. Once similar spoken instructions within the audio file are grouped together, the requirements clustering module generates an enhanced digital audio file using the concatenated instructions and stores the enhanced digital audio file in memory.

In some embodiments, a system accesses a first digital audio file that includes a plurality of spoken instructions. The system converts the first digital audio file to a first spectrogram image, applies a filter to determine whether an image quality of the first spectrogram image is below a predetermined image quality, and in response, generates a second spectrogram image from the first spectrogram image using a training model. The system converts the second spectrogram image to a second digital audio file and converts the second digital audio file into multiple vectors that each correspond to a particular spoken instruction. The system identifies related vectors and concatenates the related vectors together in order to create a plurality of concatenated vectors. The system generates, using the plurality of concatenated vectors, a third digital audio file that includes concatenated spoken instructions from the first digital audio file.

Certain embodiments provide one or more technical advantages. For example, certain embodiments improve the efficiency of a computer or software code by automatically generating enhanced digital audio files that may be used by other software applications. In some situations, digital audio files may be used to store spoken instructions. For example, business users may store spoken instructions regarding database changes (e.g., changes in database schema design, functional context changes, new cluster additions, etc.) in a digital audio file. Another software application may then access the digital audio file and perform actions that correspond to the spoken instructions in the digital audio file. However, the audio stored in digital audio files may be of poor quality and may include ungrouped spoken instructions. This may lead to unwanted situations where software applications must use excessive resources such as memory and processing power to process the digital audio file, thereby causing inefficient use of computer resources. However, embodiments of the disclosure automatically generate enhanced digital audio files that have concatenated spoken instructions, thereby optimizing dedicated computer resources such as memory and computer processing time for the digital audio files. This promotes efficient use of available computer resources since resources such as memory and disk space will be more efficiently used.

The embodiments described in this disclosure may be integrated into a practical application of an audio file enhancer that solves multiple technical problems of typical systems. A practical application of the audio file enhancer disclosed herein is that the audio file enhancer improves the functioning of a computer or software code by automatically converting an input digital audio file into an enhanced digital audio file that can then be used by certain software applications. The enhanced digital audio file generated by the audio file enhancer has enhanced audio quality, which may help certain applications that utilize digital audio files to be more accurate and to function more efficiently. In addition, the spoken instructions within the enhanced digital audio file that is generated by the audio file enhancer are concatenated (e.g., similar spoken requirements are grouped together), which decreases processing time of certain applications that utilize digital audio files. The functioning of computer systems is increased by the audio file enhancer since less processing power and memory may be required by applications that utilize the enhanced digital audio files generated by the audio file enhancer.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of this disclosure, reference is now made to the following brief description.

DETAILED DESCRIPTION

Figure 1:
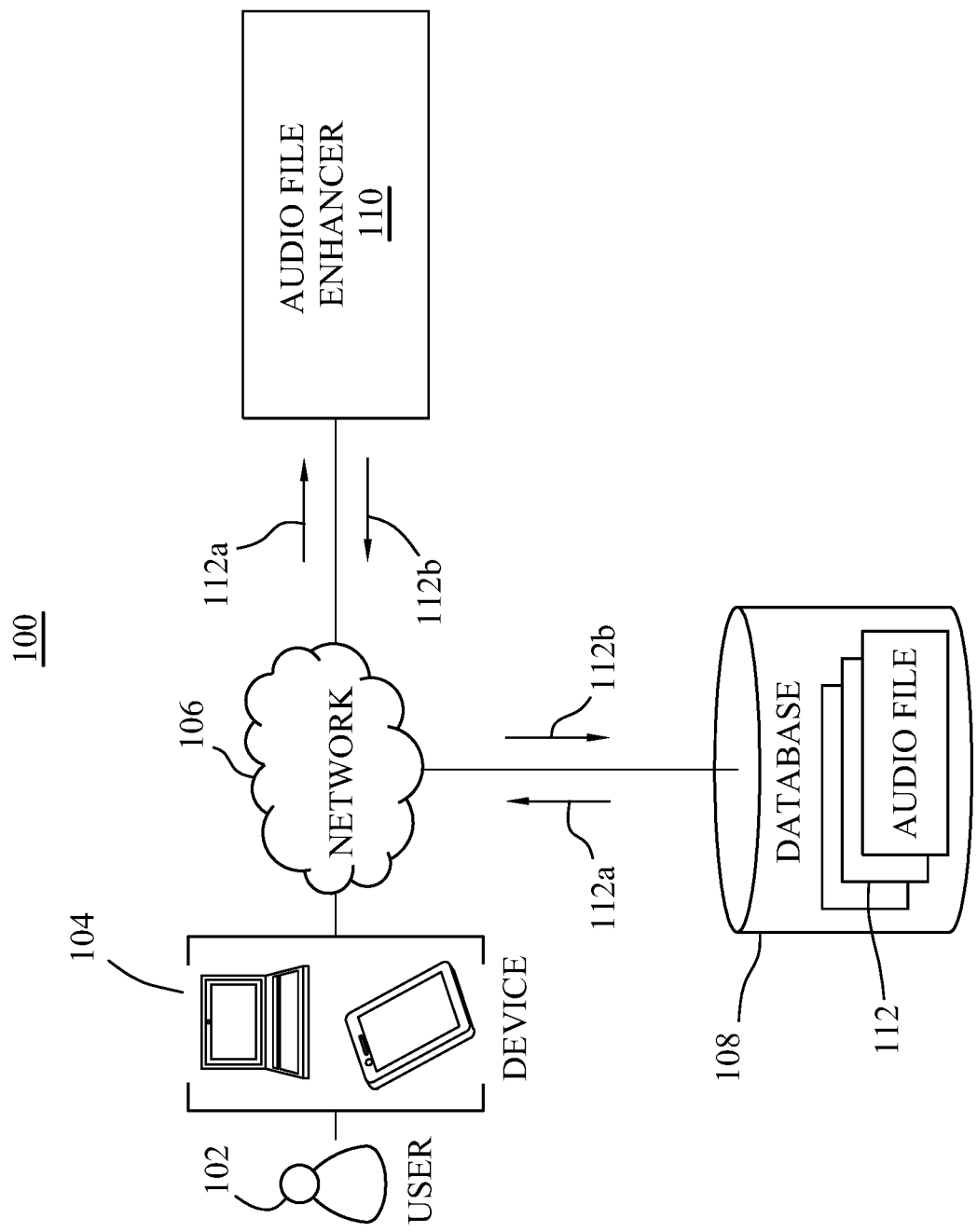
FIG. 1 is a schematic diagram of an example system for audio enhancement and conversion, according to certain embodiments.
Figure 2:
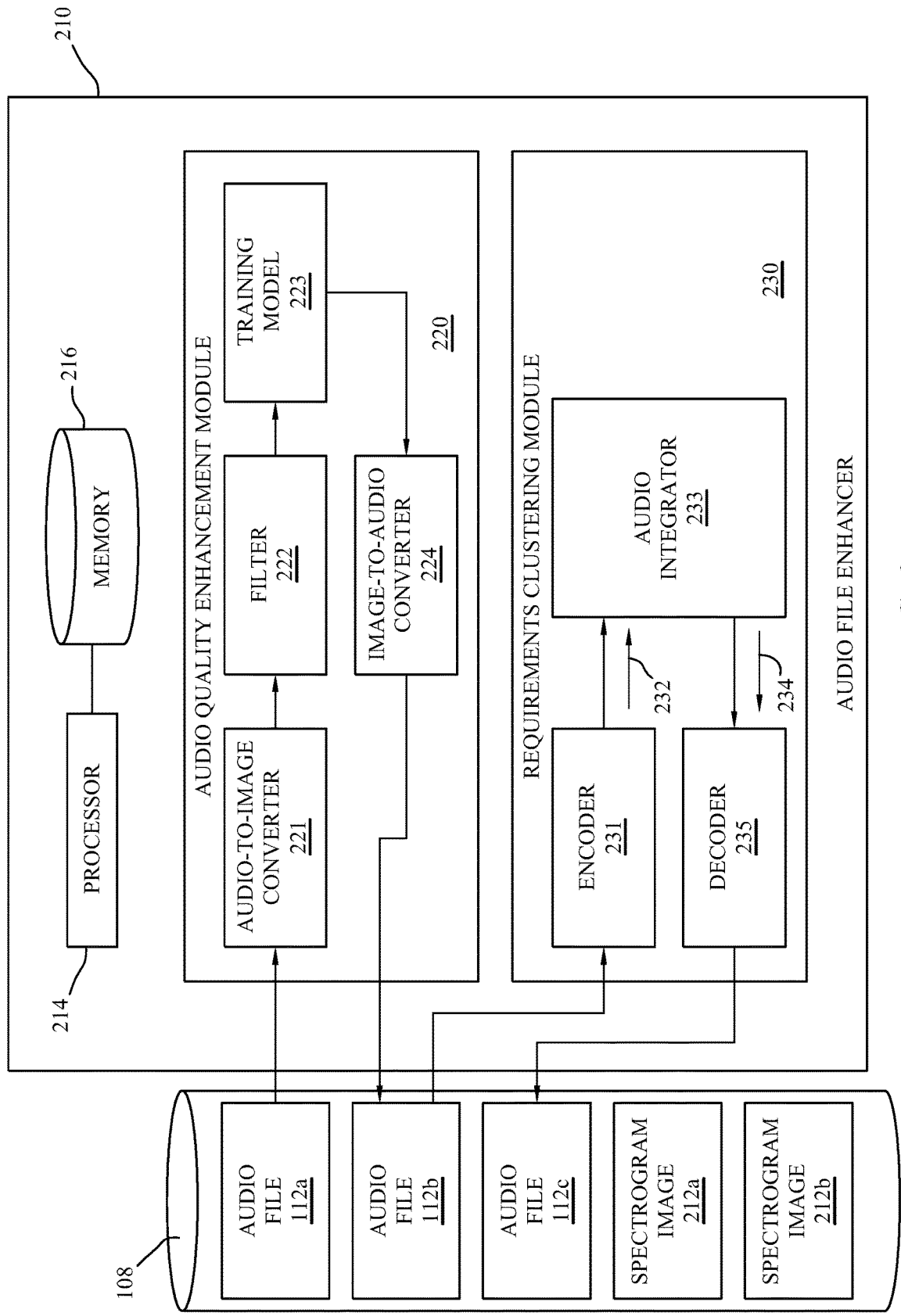
FIG. 2 is a schematic diagram of an example audio file enhancer that may be used in the system of FIG. 1, according to certain embodiments.
Figure 3:
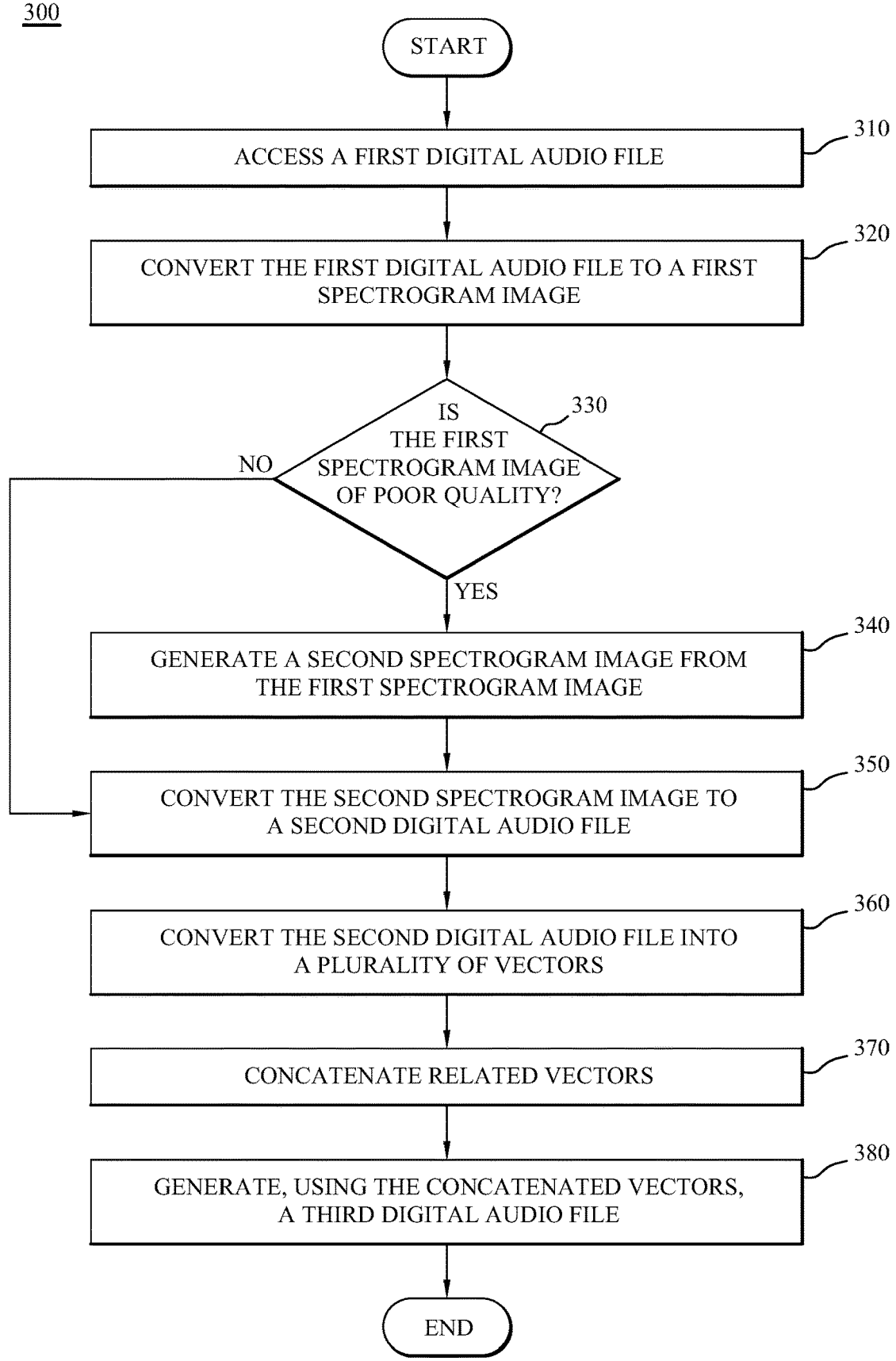
FIG. 3 is a flowchart of a method for audio file enhancement, according to certain embodiments.

Embodiments of the present disclosure and its advantages are best understood by referring to FIGS. 1 through 3 of the drawings, like numerals being used for like and corresponding parts of the various drawings.

Digital audio files are computer files that store audio in computer memory. As one example, a digital audio file may store digitized audio captured by a microphone. Digital audio files may be used by various enterprise applications to increase worker productivity. For example, business users may generate audio files in order to transmit spoken instructions for a certain application. As a specific example, business users may speak instructions regarding database changes (e.g., changes in database schema design, functional context changes, new cluster additions, etc.) into a microphone in order to record the instructions into a digital audio file. The digital audio file may then be analyzed by an application in order to implement the spoken instructions. However, the audio stored in digital audio files may sometimes not be usable by certain applications. For example, the audio stored in digital audio files may be corrupted, unintelligible, or otherwise of poor quality.

This disclosure contemplates an audio file enhancer that automatically converts an input digital audio file into an output digital audio file that is more usable by various applications. Generally, certain embodiments of the audio file enhancer first enhance the quality of the input digital audio file using an audio quality enhancement module (e.g., audio quality enhancement module 220 described below). The audio quality enhancement module transforms the input digital audio file into a spectrogram image, utilizes a training model to produce an enhanced spectrogram image, and then transforms the enhanced spectrogram image back into a digital audio file. The output digital audio file is then analyzed by certain embodiments using a requirements clustering module (e.g., requirements clustering module 230 described below). The requirements clustering module analyzes the output digital audio file from the audio quality enhancement module in order to identify and group similar spoken instructions within the audio file. Once similar spoken instructions within the audio file are concatenated, the requirements clustering module generates an enhanced digital audio file using the concatenated instructions and stores the enhanced digital audio file in memory.

A practical application of the audio file enhancer disclosed herein is that the audio file enhancer improves the functioning of a computer or software code by automatically converting an input digital audio file into an enhanced digital audio file that can then be used by certain software applications. The enhanced digital audio file generated by the audio file enhancer has enhanced audio quality, which may help certain applications that utilize digital audio files to be more accurate and to function more efficiently. In addition, the spoken instructions within the enhanced digital audio file that is generated by the audio file enhancer are concatenated (e.g., similar spoken requirements are grouped together), which decreases processing time of certain applications that utilize digital audio files. The functioning of computer systems is increased by the audio file enhancer since less processing power and memory may be required by applications that utilize the enhanced digital audio files generated by the audio file enhancer. The system will be described in more detail using FIGS. 1 through 3.

FIG. 1 illustrates an example system 100. As seen in FIG. 1, system 100 includes one or more devices 104, a network 106, a database 108, and an audio file enhancer 110. Generally, system 100 automatically transforms an input audio file 112a into an enhanced audio file 112b that may be used by another software application. In particular embodiments, system 100 improves the functioning of a computer by generating an enhanced audio file 112b that has enhanced audio quality and concatenated spoken instructions, thereby enabling computer code (e.g., another software application) to be more accurate and to run more efficiently (e.g., less computing power and memory requirements).

User 102 uses devices 104 to interact with other components of system 100. For example, user 102 may be a software developer that uses a device 104 to develop software code. As another example, user 102 may use device 104 to initiate an audio file enhancement using audio file enhancer 110. As yet another example, user 102 may use device 104 to record and store audio file 112 in database 108. Device 104 may receive communications from other components of system 100, such as audio file enhancer 110. For example, device 104 may receive an enhanced audio file 112b from audio file enhancer 110.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 108 stores information used by other components of system 100. In some embodiments, database 108 may be any computer storage disk, computer memory unit, or computer-readable non-transitory storage media. For example, database 108 may store audio files 112 (e.g., a first audio file 112a, a second audio file 112b, a third audio file 112c, etc.), which are electronic computer files that store digitized audio in computer memory. Some example formats of audio files 112 are WAV, MP3, and M4A, but audio file 112 may be in any other appropriate format. In some embodiments, audio files 112 each contain multiple spoken instructions by user 102. For example, audio files 112 may include spoken instructions regarding database changes (e.g., changes in database schema design, functional context changes, new cluster additions, etc.). In some embodiments, audio files 112 may be utilized by other software applications to implement the spoken instructions within audio files 112. For example, a software application such as Speech2Text may analyze audio files 112 in order to implement the spoken database changes contained within audio files 112.

In operation, audio file enhancer 110 automatically converts an input digital audio file 112a into an output digital audio file 112b that is enhanced and more usable by various other software applications. In some embodiments, audio file enhancer 110 first enhances the quality of input digital audio file 112a using an audio quality enhancement module (e.g., audio quality enhancement module 220 described below in reference to FIG. 2). The audio quality enhancement module transforms the input digital audio file 112a into a spectrogram image, utilizes a training model to produce an enhanced spectrogram image, and then transforms the enhanced spectrogram image back into an output digital audio file. The output digital audio file is then analyzed by certain embodiments using a requirements clustering module (e.g., requirements clustering module 230 described below in reference to FIG. 2). The requirements clustering module analyzes the output digital audio file from the audio quality enhancement module in order to identify and group similar spoken instructions within the audio file. Once similar spoken instructions within the audio file are concatenated, the requirements clustering module generates an enhanced digital audio file 112b using the concatenated instructions and stores enhanced digital audio file 112b in memory such as database 108. By automatically enhancing digital audio files to have enhanced audio quality, audio file enhancer 110 provides a practical application of helping certain applications that utilize digital audio files to be more accurate and to function more efficiently. In addition, the spoken instructions within the enhanced digital audio file 112b that is generated by audio file enhancer 110 may be concatenated (e.g., similar spoken requirements are grouped together), which decreases processing time and memory requirements of certain applications that utilize digital audio files, thereby increasing the functioning of computer systems. Specific details about how certain embodiments of audio file enhancer 110 generate enhanced digital audio file 112b are discussed in more detail below with respect to FIG. 2.

FIG. 2 is a schematic diagram of an example audio file enhancer 210 that may be used as audio file enhancer 110 in system 100 of FIG. 1. In some embodiments, audio file enhancer 210 may include or otherwise utilize a processor 114 and a memory 116, which may be configured to perform any of the actions and functions of audio file enhancer 210 described herein. In some embodiments, audio file enhancer 210 may utilize various modules, applications, or code to perform the functions described herein. For example, audio file enhancer 210 may include an audio quality enhancement module 220 and a requirements clustering module 230, which are described in more detail below.

Processor 114 is any electronic circuitry, including, but not limited to microprocessors, application specific integrated circuits (ASIC), application specific instruction set processor (ASIP), and/or state machines, that communicatively couples to memory 116 and controls the operation of audio file enhancer 210. Processor 114 may be 8-bit, 16-bit, 32-bit, 64-bit or of any other suitable architecture. Processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 114 may include other hardware that operates software to control and process information. Processor 114 executes software stored on memory to perform any of the functions described herein. For example, processor 114 executes modules of container image optimizer 110 and audio file enhancer 210 such as audio quality enhancement module 220 and requirements clustering module 230 (and their submodules shown in FIG. 2). Processor 114 controls the operation and administration of audio file enhancer 210 by processing information received from devices 104, network 106, and memory 116. Processor 114 may be a programmable logic device, a microcontroller, a microprocessor, any suitable processing device, or any suitable combination of the preceding. Processor 114 is not limited to a single processing device and may encompass multiple processing devices.

Memory 116 may store, either permanently or temporarily, data, operational software, or other information for processor 114. Memory 116 may include any one or a combination of volatile or non-volatile local or remote devices suitable for storing information. For example, memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 116, a disk, a CD, or a flash drive. In particular embodiments, the software may include an application executable by processor 114 to perform one or more of the functions described herein.

In some embodiments, audio file enhancer 210 includes audio quality enhancement module 220. In general, audio quality enhancement module 220 is executed by processor 114 in order to transform a first audio file 112a into a second audio file 112b that has higher quality audio than first audio file 112a. In some embodiments, audio quality enhancement module 220 includes an audio-to-image converter 221, a filter 222, a training model 223, and an image-to-audio converter 224 as illustrated in FIG. 2 to transform first audio file 112a into a second audio file 112b. Each of these modules are discussed in more detail below.

Audio quality enhancement module 220 includes audio-to-image converter 221 in certain embodiments. In general, audio-to-image converter 221 is executed by processor 114 in order to access first audio file 112a from memory (e.g., memory 216 or database 108) and then transform first audio file 112a into a first spectrogram image 212a. A spectrogram image is a visual representation of the spectrum of frequencies of a signal as it varies over time. In this context, first spectrogram image 212a is a visual representation of the frequencies of first audio file 112a as it varies over time. In some embodiments, audio-to-image converter 221 utilizes a Fourier-related transform such as short-time Fourier transform (STFT) to transform first audio file 112a into first spectrogram image 212a, which visually represents the changing Fourier spectrum of first audio file 112a as a function of time. In some embodiments, first spectrogram image 212a is stored in any appropriate memory such as memory 216 or database 108.

In some embodiments, audio quality enhancement module 220 includes filter 222. In general, filter 222 is executed by processor 114 in order to determine an image quality of first spectrogram image 212a and then compare the determined image quality to a predetermined image quality. The image quality of first spectrogram image 212a may be measured by any appropriate standard such as a dots per inch (DPI) value or a signal-to-noise ratio. If the determined image quality of first spectrogram image 212a is below the predetermined image quality, filter 222 passes first spectrogram image 212a to training model 223. Otherwise, if the determined image quality of first spectrogram image 212a is equal to or greater than the predetermined image quality, filter 222 does not pass first spectrogram image 212a to training model 223. To determine the image quality of first spectrogram image 212a, filter 222 may utilize any appropriate technique to determine a DPI or signal-to-noise ratio of first spectrogram image 212a. In some embodiments, for example, filter 222 determines a DPI value of first spectrogram image 212a. The DPI value implies the density of pixels per inch in an image. If the determined DPI value of first spectrogram image 212a is less than a predetermined DPI value, filter 222 passes first spectrogram image 212a to training model 223. Conversely, if the determined DPI value of first spectrogram image 212a is not less than a predetermined DPI value, filter 222 does not pass first spectrogram image 212a to training model 223. An example of a predetermined DPI value that may be used by filter 222 is 300 DPI. As another example, filter 222 determines a signal-to-noise ratio (e.g., a peak signal-to-noise ratio (PSNR)) of first spectrogram image 212a. In general, an image is higher quality when the noise is low (e.g., PSNR greater than 40%). If the determined signal-to-noise ratio of first spectrogram image 212a is less than a predetermined signal-to-noise ratio value, filter 222 passes first spectrogram image 212a to training model 223. Conversely, if the determined signal-to-noise ratio value of first spectrogram image 212a is not less than a predetermined noise ratio value, filter 222 does not pass first spectrogram image 212a to training model 223. An example of a predetermined signal-to-noise ratio value that may be used by filter 222 is 40% PSNR.

Audio file enhancer 210 includes training model 223 in certain embodiments. In general, training model 223 is executed by processor 114 in order to transform first spectrogram image 212a into a second spectrogram image 212b that has a higher image quality than first spectrogram image 212a. In some embodiments, training model 223 is a trained deep-learning model that is used to predict the signals and noise present in first spectrogram image 212a and then generate a higher-quality second spectrogram image 112b by increasing the density of the signals and reducing the density of noise in first spectrogram image 212a. During training, training model 223 analyzes multiple high- and low-quality images in order to learn the relationship between the high- and low-quality images and to attain the knowledge to classify noise and signals present in an image. Using this training knowledge, training model 223 predicts and reduces the noise (e.g., removes the noise pixels) in first spectrogram image 212a in order to produce a higher-quality second spectrogram image 112b. As a specific example, training model 223 utilizes its prior training to identify the signal in first spectrogram image 212a, to increase the pixel density through bicubic interpolation of first spectrogram image 212a, and then whiten out the noise in first spectrogram image 212a, thereby producing a higher-quality second spectrogram image 112b. In some embodiments, training model 223 utilizes an encoder/decoder network to down sample first spectrogram image 212a and then up sample to create second spectrogram image 212b with a higher resolution. In some embodiments, second spectrogram image 212b is stored in any appropriate memory such as memory 216 or database 108.

Audio quality enhancement module 220 may include image-to-audio converter 224. In general, image-to-audio converter 224 is executed by processor 114 in order to transform second spectrogram image 212b into a second audio file 112b using an inverse conversion process from what is used in audio-to-image converter 221 (e.g., an inverse Fourier-related transform process). Second audio file 112b includes enhanced audio over the audio of first audio file 112a. In some embodiments, audio-to-image converter 221 utilizes inverse short-time Fourier transform (ISTFT) to transform second spectrogram image 212b into second audio file 112b. In some embodiments, second audio file 112b is stored in any appropriate memory such as memory 216 or database 108.

In certain embodiments, audio file enhancer 210 includes requirements clustering module 230. In general, requirements clustering module 230 utilizes various modules such as an encoder 231, an audio integrator 233, and a decoder 235 to identify and concatenate related spoken instructions within second audio file 112b in order to generate a third audio file 112c. In some embodiments, encoder 231, audio integrator 233, and decoder 235 are communicatively coupled as illustrated in FIG. 2. Each of these modules are discussed in more detail below.

In some embodiments, requirements clustering module 230 includes an encoder 231. In general, encoder 231 is executed by processor 114 in order to access second audio file 112b from memory (e.g., memory 216 or database 108) and then transform second audio file 112b into multiple vectors 232. Encoder 231 is any appropriate layer of a neural network that compresses second audio file 112b into vectors 232. For example, Tensorflow is used in some embodiments for encoder 231. Each vector 232 is a numerical representation of a portion of second audio file 112b that corresponds to an individual spoken instruction within second audio file 112b. For example, second audio file 112b may include the following sequentially spoken instructions (listed in the order in which they are spoken within second audio file 112b):

instruction #1 for System #1
instruction #2 for System #2
instruction #3 for System #1
instruction #4 for System #3
instruction #5 for System #1
instruction #6 for System #3

In this example, encoder 231 compresses second audio file 112b into six individual vectors 232 that each correspond to one of instructions #1-6 listed above.

Requirements clustering module 230 includes audio integrator 233 in certain embodiments. Generally, audio integrator 233 is executed by processor 114 in order to analyze vectors 232 and cluster similar spoken instructions within second audio file 112b together. As an example, second audio file 112b may include multiple spoken instructions from user 102 for different systems or applications (e.g., six different instructions for three different systems as shown in the example above). In some situations, such as the example above, spoken instructions for a single system may not be sequentially spoken within digital audio file 112 (i.e., spoken instructions within digital audio file 112 are not grouped together according to system/application). Having ungrouped spoken instructions may cause unnecessary processing by other software applications that are processing second audio file 112b. This, in turn, may cause inefficiencies in computer systems such as wasted processing power and memory. To address these and other problems caused by ungrouped spoken instructions within second audio file 112b, audio integrator 233 analyzes vectors 232 using any appropriate vector-analysis technique to determine the similarity of vectors 232 and then concatenate similar vectors 232 together. For example, audio integrator 233 may compute the Euclidean distances between each particular vector 232 and the remaining vectors 232. The computed distances may then be compared (e.g., using standard deviation or mean calculations) to determine which vectors 232 are from the same distribution in order to concatenate similar vectors 232 together. For example, if the determined standard deviations of the distances between two or more vectors 232 are the same or similar (e.g., within 1%, 2%, 5%, etc.), audio integrator 233 may determine that the two or more vectors 232 are related instructions and take action to group the related instructions together (e.g., place similar vectors 232 together). Using the above example of second audio file 112b that includes spoken instructions #1-6, audio integrator 233 would determine that vectors 232 that correspond to instructions #1, #3, and #5 are related instructions (i.e., each instruction is for System #1) and therefore group the vectors 232 that correspond to instructions #1, #3, and #4 together. Likewise, audio integrator 233 would determine that vectors 232 that correspond to instructions #4 and #6 are related instructions (i.e., each instruction is for System #3) and therefore group the vectors 232 that correspond to instructions #4 and #6 together.

In some embodiments, requirements clustering module 230 includes a decoder 235. In general, decoder 235 is executed by processor 114 in order to convert the grouped vectors 232 from audio integrator 233 back into a third audio file 112c. Decoder 235 is any appropriate layer of a neural network that decompresses vectors 232 into third audio file 112c. For example, Tensorflow is used in some embodiments for decoder 235. Third audio file 112c has the same audio quality as second audio file 112b. However, third audio file 112c is an improvement over second audio file 112b since related spoken instructions within third audio file 112c have been grouped together by requirements clustering module 230. In some embodiments, third audio file 112c is stored in any appropriate memory such as memory 216 or database 108 where it may be utilized by another software application (e.g., to implement the spoken instructions within third audio file 112c).

FIG. 3 illustrates a method 300 for audio file enhancement, according to certain embodiments. In general, method 300 may be utilized by audio file enhancer 110 and audio file enhancer 210 to generate an enhanced digital audio file (e.g., third audio file 112c) from an input digital audio file (e.g., first audio file 112a). Method 300 may be executed by processor 114. Method 300 may begin at step 310 where method 300 accesses a first digital audio file. In some embodiments, the first digital audio file is first audio file 112a that includes multiple spoken instructions. In some embodiments, step 310 is performed by audio quality enhancement module 220.

At step 320, the first digital audio file accessed in step 310 is converted into a first spectrogram image. In some embodiments, step 320 is performed by audio-to-image converter 221. In some embodiments, the first spectrogram image is first spectrogram image 212a. In some embodiments, method 300 uses short-time Fourier transform (STFT) in step 320 to convert the first digital audio file to the first spectrogram image.

At step 330, method 300 determines whether the first spectrogram image of step 320 is of poor quality. To determine whether the first spectrogram image of step 320 is of poor quality, some embodiments of method 300 apply a filter (e.g., filter 222) to determine whether an image quality of the first spectrogram image is below a predetermined image quality. If it is determined in step 330 that the image quality of the first spectrogram image is below the predetermined image quality (i.e., the first spectrogram image is of poor quality), method 300 proceeds to step 340. If it is determined in step 330 that the image quality of the first spectrogram image is equal to or above the predetermined image quality (i.e., the first spectrogram image is not of poor quality), method 300 may proceed to step 350 where the first spectrogram image is converted to a second digital audio file. In some embodiments, step 330 includes determining whether a dots-per-inch (DPI) of the first spectrogram image is less than a predetermined DPI amount. In other embodiments, step 330 includes determining whether a noise ratio of the first spectrogram image is less than a predetermined noise ratio amount.

At step 340, method 300 generates a second spectrogram image from the first spectrogram image of step 320 using a training model. In some embodiments, the training model is training model 223. The second spectrogram image has a higher image quality than the first spectrogram image. In some embodiments, the second spectrogram image is second spectrogram image 212b.

At step 350, method 300 converts the second spectrogram image of step 340 to a second digital audio file. In some embodiments, step 350 is performed by image-to-audio converter 224. In some embodiments, the second digital audio file is second audio file 112b. In some embodiments, the second spectrogram image is converted to the second digital audio file in step 350 using inverse short-time Fourier transform (ISTFT).

At step 360, method 300 converts the second digital audio file of step 340 into a plurality of vectors. In some embodiments, each vector corresponds to a particular one of the spoken instructions. In some embodiments, the vectors are vectors 232. In some embodiments, method 300 uses an encoder such as encoder 231 to convert the second digital audio file of step 350 into the plurality of vectors. In some embodiments, Tensorflow is used for the encoder of step 360.

At step 370, method 300 concatenates the vectors of step 350. In some embodiments, step 360 is performed by audio integrator 233. In some embodiments, step 370 includes identifying a plurality of related vectors from the plurality of vectors of step 360 and then concatenating one or more of the plurality of related vectors together in order to create a plurality of concatenated vectors. In some embodiments, identifying the related vectors includes computing the Euclidean distances between each particular vector and each of the remaining vectors. The computed distances are then compared (e.g., using standard deviation or mean calculations) to determine which vectors are from the same distribution in order to concatenate similar vectors together. If, for example, the determined standard deviations of the distances between two or more vectors are the same or similar (e.g., within 1%, 2%, 5%, etc.), method 300 determines that the two or more vectors are related vectors and therefore concatenates the related vectors together in order to create a plurality of concatenated vectors.

At step 380, method 300 generates, using the plurality of concatenated vectors of step 370, a third digital audio file. The third digital audio file includes concatenated spoken instructions from the first digital audio file. In some embodiments, step 380 is performed by a decoder such as decoder 235. In some embodiments, Tensorflow is used for the decoder of step 360. In some embodiments, the third digital audio file is third audio file 112c. In some embodiments, the third digital audio file is stored in one or more memory units. After step 380, method 300 may end.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
 a processor; and
 one or more memory units;
 a first digital audio file stored in the one or more memory units, the first digital audio file comprising a plurality of spoken instructions;
 an audio quality enhancement module stored in the one or more memory units, the audio quality enhancement module executed by the processor and configured to:
  access the first digital audio file;
  convert the first digital audio file to a first spectrogram image;
  apply a filter to determine whether an image quality of the first spectrogram image is below a predetermined image quality;
  in response to determining that the image quality of the first spectrogram image is below the predetermined image quality, generate a second spectrogram image from the first spectrogram image using a training model, the second spectrogram image having a higher image quality than the image quality of the first spectrogram image; and
  convert the second spectrogram image to a second digital audio file; and
 a requirements clustering module stored in the one or more memory units, the requirements clustering module executed by the processor and configured to:
  convert, using an encoder, the second digital audio file into a plurality of vectors, each vector corresponding to a particular one of the plurality of spoken instructions;
  identify a plurality of related vectors that each correspond to a particular one of the plurality of spoken instructions from the plurality of vectors;
  concatenate the plurality of related vectors that each correspond to a particular one of the plurality of spoken instructions together in order to create a plurality of concatenated vectors;
  generate, using a decoder on the plurality of concatenated vectors, a third digital audio file, the third digital audio file comprising concatenated spoken instructions from the first digital audio file; and
  store the third digital audio file in the one or more computer-readable non-transitory storage media.

2. The system of claim 1, wherein the first digital audio file is converted to the first spectrogram image using short-time Fourier transform (STFT).

3. The system of claim 1, wherein the second spectrogram image is converted to the second digital audio file using inverse short-time Fourier transform (ISTFT).

4. The system of claim 1, wherein generating the second spectrogram image from the first spectrogram image using the training model comprises:
 increasing a pixel density of the first spectrogram image using bicubic interpolation; and
 whitening out noise in the first spectrogram image.

5. The system of claim 1, wherein applying the filter to determine whether the image quality of the first spectrogram image is below the predetermined image quality comprises:
 determining whether a dots-per-inch (DPI) of the first spectrogram image is less than a predetermined DPI amount; or
 determining whether a signal-to-noise ratio of the first spectrogram image is less than a predetermined noise ratio amount.

6. The system of claim 1, wherein converting, using the encoder, the second digital audio file into the plurality of vectors comprises using Tensorflow.

7. The system of claim 1, wherein identifying the plurality of related vectors from the plurality of vectors comprises:
 calculating a standard deviation of each of the plurality of vectors; and
 comparing the standard deviations of each of the plurality of vectors in order to identify the plurality of related vectors.

8. A method by a computing device, the method comprising:

accessing a first digital audio file stored in one or more memory units, the first digital audio file comprising a plurality of spoken instructions;

converting the first digital audio file to a first spectrogram image;

applying a filter to determine whether an image quality of the first spectrogram image is below a predetermined image quality;

in response to determining that the image quality of the first spectrogram image is below the predetermined image quality, generating a second spectrogram image from the first spectrogram image using a training model, the second spectrogram image having a higher image quality than the image quality of the first spectrogram image;

converting the second spectrogram image to a second digital audio file;

converting, using an encoder, the second digital audio file into a plurality of vectors, each vector corresponding to a particular one of the plurality of spoken instructions;

identifying a plurality of related vectors that each correspond to a particular one of the plurality of spoken instructions from the plurality of vectors;

concatenating the plurality of related vectors that each correspond to a particular one of the plurality of spoken instructions together in order to create a plurality of concatenated vectors;

generating, using a decoder on the plurality of concatenated vectors, a third digital audio file, the third digital audio file comprising concatenated spoken instructions from the first digital audio file; and storing the third digital audio file in the one or more memory units.

9. The method of claim 8, wherein the first digital audio file is converted to the first spectrogram image using short-time Fourier transform (STFT).

10. The method of claim 8, wherein the second spectrogram image is converted to the second digital audio file using inverse short-time Fourier transform (ISTFT).

11. The method of claim 8, wherein generating the second spectrogram image from the first spectrogram image using the training model comprises:
increasing a pixel density of the first spectrogram image using bicubic interpolation; and
whitening out noise in the first spectrogram image.

12. The method of claim 8, wherein applying the filter to determine whether the image quality of the first spectrogram image is below the predetermined image quality comprises:
determining whether a dots-per-inch (DPI) of the first spectrogram image is less than a predetermined DPI amount; or
determining whether a signal-to-noise ratio of the first spectrogram image is less than a predetermined noise ratio amount.

13. The method of claim 8, wherein converting, using the encoder, the second digital audio file into the plurality of vectors comprises using Tensorflow.

14. The method of claim 8, wherein identifying the plurality of related vectors from the plurality of vectors comprises:
calculating a standard deviation of each of the plurality of vectors; and
comparing the standard deviations of each of the plurality of vectors in order to identify the plurality of related vectors.

15. One or more computer-readable non-transitory storage media embodying software that is operable when executed by a hardware processor to:
access a first digital audio file stored in one or more memory units, the first digital audio file comprising a plurality of spoken instructions;
convert the first digital audio file to a first spectrogram image;
apply a filter to determine whether an image quality of the first spectrogram image is below a predetermined image quality;
in response to determining that the image quality of the first spectrogram image is below the predetermined image quality, generate a second spectrogram image from the first spectrogram image using a training model, the second spectrogram image having a higher image quality than the image quality of the first spectrogram image;
convert the second spectrogram image to a second digital audio file;
convert, using an encoder, the second digital audio file into a plurality of vectors, each vector corresponding to a particular one of the plurality of spoken instructions;
identify a plurality of related vectors that each correspond to a particular one of the plurality of spoken instructions from the plurality of vectors;
concatenate the plurality of related vectors that each correspond to a particular one of the plurality of spoken instructions together in order to create a plurality of concatenated vectors;
generate, using a decoder on the plurality of concatenated vectors, a third digital audio file, the third digital audio file comprising concatenated spoken instructions from the first digital audio file; and
store the third digital audio file in the one or more memory units.

16. The media of claim 15, wherein the first digital audio file is converted to the first spectrogram image using short-time Fourier transform (STFT).

17. The media of claim 15, wherein the second spectrogram image is converted to the second digital audio file using inverse short-time Fourier transform (ISTFT).

18. The media of claim 15, wherein generating the second spectrogram image from the first spectrogram image using the training model comprises:
increasing a pixel density of the first spectrogram image using bicubic interpolation; and
whitening out noise in the first spectrogram image.

19. The media of claim 15, wherein applying the filter to determine whether the image quality of the first spectrogram image is below the predetermined image quality comprises:
determining whether a dots-per-inch (DPI) of the first spectrogram image is less than a predetermined DPI amount; or
determining whether a signal-to-noise ratio of the first spectrogram image is less than a predetermined noise ratio amount.

20. The media of claim 15, wherein identifying the plurality of related vectors from the plurality of vectors comprises:
calculating a standard deviation of each of the plurality of vectors; and
comparing the standard deviations of each of the plurality of vectors in order to identify the plurality of related vectors.

* * * * *